(12) United States Patent
Alexander et al.

(10) Patent No.: US 10,973,341 B2
(45) Date of Patent: Apr. 13, 2021

(54) KNITTED-IN LACES FOR SHAPING AND FITTING TEXTILES AND FABRICS

(71) Applicant: GM GLOBAL TECHNOLOGY OPERATIONS LLC, Detroit, MI (US)

(72) Inventors: Paul W. Alexander, Ypsilanti, MI (US); Nancy L. Johnson, Northville, MI (US); Janet C. Robincheck, Sterling Heights, MI (US); Daniel W. Booth, Troy, MI (US); Heidi H. Mcadoo-Wilson, Tecumseh (CA); Neil Tagner, Taylorsville, NC (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/502,520

(22) Filed: Jul. 3, 2019

(65) Prior Publication Data
US 2021/0000262 A1     Jan. 7, 2021

(51) Int. Cl.
| | | |
|---|---|---|
| *B60N 2/58* | (2006.01) | |
| *A47C 31/00* | (2006.01) | |
| *A43C 9/00* | (2006.01) | |
| *B32B 3/00* | (2006.01) | |

(52) U.S. Cl.
CPC .............. *A47C 31/006* (2013.01); *A43C 9/00* (2013.01); *B60N 2/58* (2013.01); *B32B 3/00* (2013.01); *B60N 2/5825* (2013.01); *B60N 2/5883* (2013.01)

(58) Field of Classification Search
CPC ........... Y10T 428/24033; Y10T 428/24; Y10T 428/24182; B60N 2/5825; B60N 2/5883; A43C 9/00; A47C 31/006; A47C 31/023
See application file for complete search history.

(56) References Cited

U.S. PATENT DOCUMENTS

| | | | | |
|---|---|---|---|---|
| 5,887,452 A | * | 3/1999 | Smith ................. | B60N 2/5825 66/170 |
| 5,890,381 A | * | 4/1999 | Leeke ..................... | D04B 1/22 66/170 |

OTHER PUBLICATIONS

U.S. Appl. No. 15/994,277, filed May 31, 2018, Booth et al.

* cited by examiner

*Primary Examiner* — Alexander S Thomas (57) ABSTRACT

A textile comprising: i) a fabric including a laced region associated with a surface of the textile; and ii) a thread inlaid through a plurality of points proximate a perimeter of the laced region. Tightening the thread causes opposite sides of the laced region to be cinched together, thereby forming the laced region into a flap associated with a second surface of the textile opposite the first surface. The textile further comprises a listing wire disposed in the flap. The fabric forms a plurality of perforations within the laced region. The listing wire may be accessed by an attachment device through at least one of the plurality of perforations.

13 Claims, 11 Drawing Sheets

KNITTED-IN LACES FOR SHAPING AND FITTING TEXTILES AND FABRICS

INTRODUCTION

The present disclosure relates to textiles, such as a cushion covers, having knitted-in stitching that may be selectively tightened to shape and fit the textile to another structure.

A textile is a cloth made by hand or machine, including knitting, weaving, and the like. The most common uses of textiles are for clothing and for covers for furniture, such as chairs, sofas, vehicle seats, and the like. Many uses of textiles require three-dimensional (3D) knitting to create a complex curvature. Conventionally, such 3D knitting may require gore lines or darts. A gore is a triangular piece of the textile used in shaping the textile to fit, for example, the contours of a vehicle seat cushion. A dart is a fold or tuck sewn into a fabric that comes to a point to take in slack and to provide shape to a garment or furniture covering.

However, a large number of gore lines or darts may disrupt the textile pattern or look. There is a practical limit to the number of stitches that can be added to a single fitting feature. This limits the amount of possible contouring.

Therefore, there is a need for improved textiles and methods of contouring textiles to create 3D shapes for covering for furniture, vehicle seats, garments, and the like.

SUMMARY

Further areas of applicability of the present disclosure will become apparent from the detailed description, the claims and the drawings. The detailed description and specific examples are intended for purposes of illustration only and are not intended to limit the scope of the disclosure.

It is one object of the disclosure to provide a textile comprising: i) a fabric including a first laced region associated with a first surface of the textile; and ii) a first thread that is inlaid through a first plurality of points proximate a perimeter of the first laced region. Tightening of the first thread causes opposite sides of the first laced region to be cinched together, thereby forming the first laced region into a first flap associated with a second surface of the textile opposite the first surface.

In another feature, the textile further comprises a first listing wire disposed in the first flap on the second surface.

In still another feature, the fabric forms a first plurality of perforations within the first laced region.

In yet another feature, the first listing wire may be accessed by a first attachment device through at least one of the first plurality of perforations.

In a further feature, the first laced region has an approximately symmetrical shape.

In a still further feature, the first laced region has an asymmetrical shape.

In a yet further feature, the fabric further includes a second laced region associated with the first surface of the textile, and the textile further includes a second thread that is inlaid through a second plurality of points proximate a perimeter of the second laced region. Tightening of the second thread causes opposite sides of the second laced region to be cinched together, thereby forming the second laced region into a second flap associated with the second surface of the textile opposite the first surface.

In one feature, the textile further comprises a second listing wire disposed in the second flap on the second surface.

In another feature, the fabric forms a second plurality of perforations within the second laced region.

In still another feature, the second listing wire may be accessed by a second attachment device through at least one of the second plurality of perforations.

It is another object of the disclosure to provide an article of manufacture comprising: i) a base structure requiring a cover; ii) a textile suitable to cover the base structure. The textile comprises: a) a fabric including a first laced region associated with a first surface of the textile; and b) a first thread that is inlaid through a first plurality of points proximate a perimeter of the first laced region. Tightening of the first thread causes opposite sides of the first laced region to be cinched together, thereby forming the first laced region into a first flap associated with a second surface of the textile opposite the first surface.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

This disclosure describes an improved textile that creates visually pleasing tie-down structures for 3-D knitted seat trim covers. The disclosed textile allows for creation of tubular structures on one side or surface of the trim cover in the wale direction of the knitted textile. The disclosure also describes using flatbed knitting machine capabilities to create integrated lacing that pulls the textile together to fit the textile around complex contours and extreme variations in shape. The laced fitting features may be used independently or in conjunction with gores or darts to increase the amount of curvature that can be implemented in a knit textile. The laced fittings can dramatically change the curvature continuously and instantly, not incrementally as with gores or darts.

Figure 1:
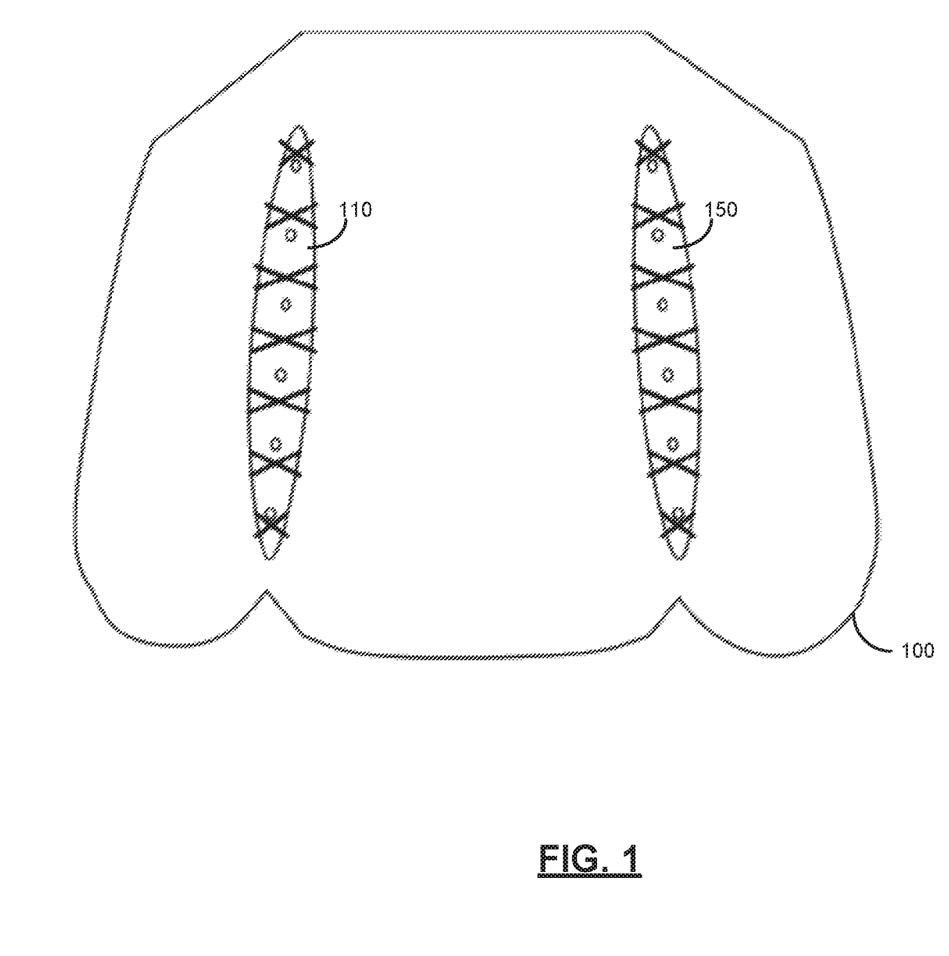
FIG. 1 is a top view of a textile including two laced regions according to one embodiment of the disclosure.

The disclosed textile may be tailored to allow for easier insertion of listing wires. For the purposes of this disclosure and the claims herein, a listing wire include any rods or wires made of metals, plastics, or other rigid materials. Also, for the purposes of this disclosure and the claims herein, the term "lace" or "lacing" refers to inlaid loose stitching activated by secondary cinching operation. Additionally, asymmetric laced regions create curvature and contours in the textile when cinched, enabling better fitting of complex shapes with extreme variations in cross-section FIG. 1 is a top view of a textile 100, including two laced regions 110 and 150, according to an embodiment of the disclosure. The textile 100 may be, for example, a fabric cover that covers the cushions of a vehicle seat. Lace(s) cross the laced regions 110 and 150 on a first side (or upper surface) of the textile 100. The lace(s) then may be tightened in order to cinch the laced regions 110 and 150 into flaps or folds on the opposing side (or bottom surface) of the textile 100. As will be explained below in detail, the flaps on the bottom surface may contain a listing wire that allows the flap to function as a tie-down structure to attach the textile 100 to another structure, such as the seat cushion of a vehicle seat or the armrest of a sofa or other piece of furniture. The cinching may change the overall contours and shape of the textile 100, including in three dimensions.

The laced regions 110 and 150 may be knitted with a less bulky stitch pattern or less bulky yarn to reduce mass and weight. A monofilament or elastic yarn may be used to increase strength, compliance, and/or stretch. The lace material may be left exposed for aesthetic effect or may be completely or partly composed of a fusible yarn that disappears as it melts into and binds the knitted pocket shut when steamed after cinching. Fusible yarn may be added in the laced regions 110 and 150 to stiffen the textile 100. The regions without the fusible yarn will create natural fold lines.

Figure 2A:
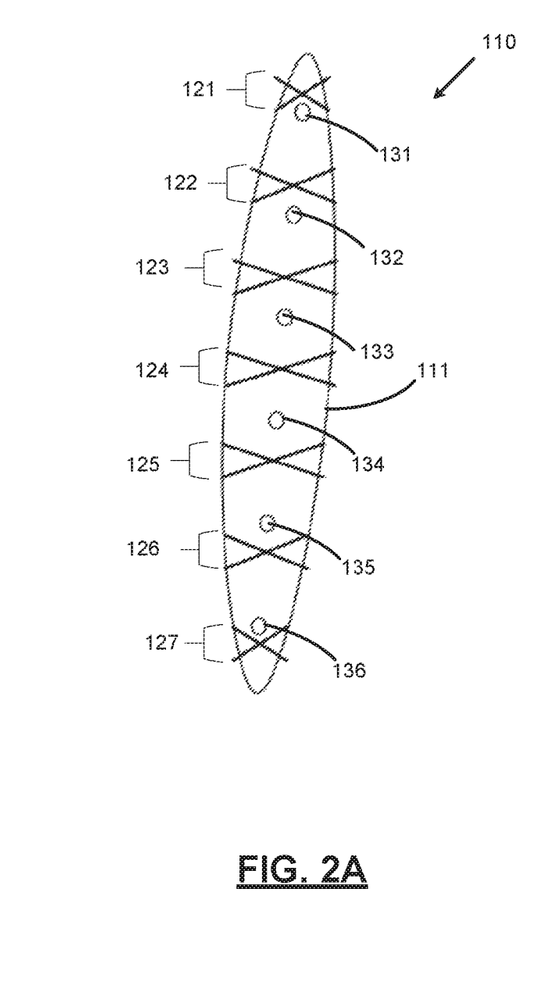
FIG. 2A is a top view of a symmetrical laced region according to one embodiment of the disclosure.

FIG. 2A is a top view of a symmetrical laced region 110 according to one embodiment of the disclosure. The symmetrical laced region 110 is bounded by an approximately elliptically-shaped perimeter 111. A plurality of crossed pairs of laces 121-127 span the symmetrical laced region 110 and are stitched through the textile 100. The interior of the symmetrical laced region 110 contains a plurality of perforations 131-136 aligned approximately along the centerline of the laced region 110. The perimeter 111 does not actually appear on the surface of laced region 110, but instead defines the approximate locations of the thread points in the textile 110 through which the crossed pairs of laces 121-127 are inserted.

Figure 2B:
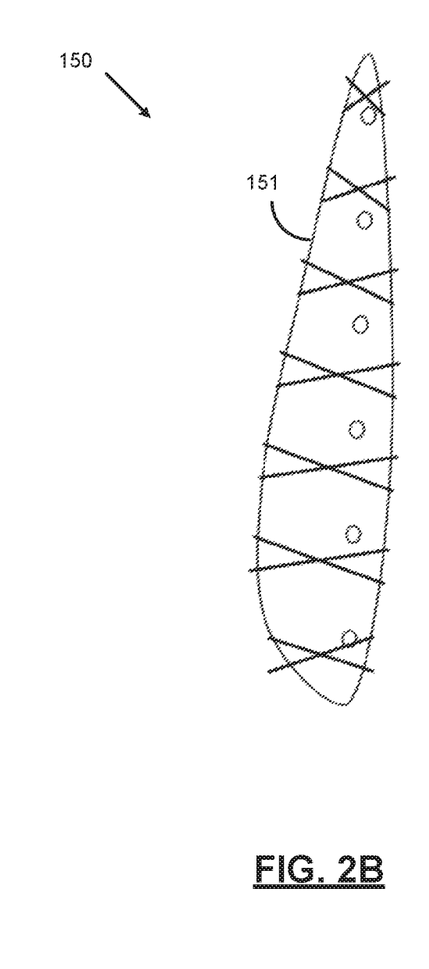
FIG. 2B is a top view of an asymmetrical laced region according to one embodiment of the disclosure.

FIG. 2B is a top view of an asymmetrical laced region 150 according to one embodiment of the disclosure. The asymmetrical laced region 150 is bounded by an irregularly shaped perimeter 151. As in FIG. 2A, a plurality of crossed pairs of laces span the asymmetrical laced region 150 and are stitched through the textile 100. In addition, the interior of the asymmetrical laced region 150 contains a plurality of perforations. Due to the asymmetrical shape, one side of perimeter 151 is a longer span of material than the opposing side. The extra material is pulled together and laced to the shorter span on the opposite side. When the laces are drawn, the mismatch in the lengths of the material on either side will case the knit to bunch up in area, forming pleats and generating contours, 3D curvatures, protrusion, indentations, and other types of fitting operations.

Figure 2C:
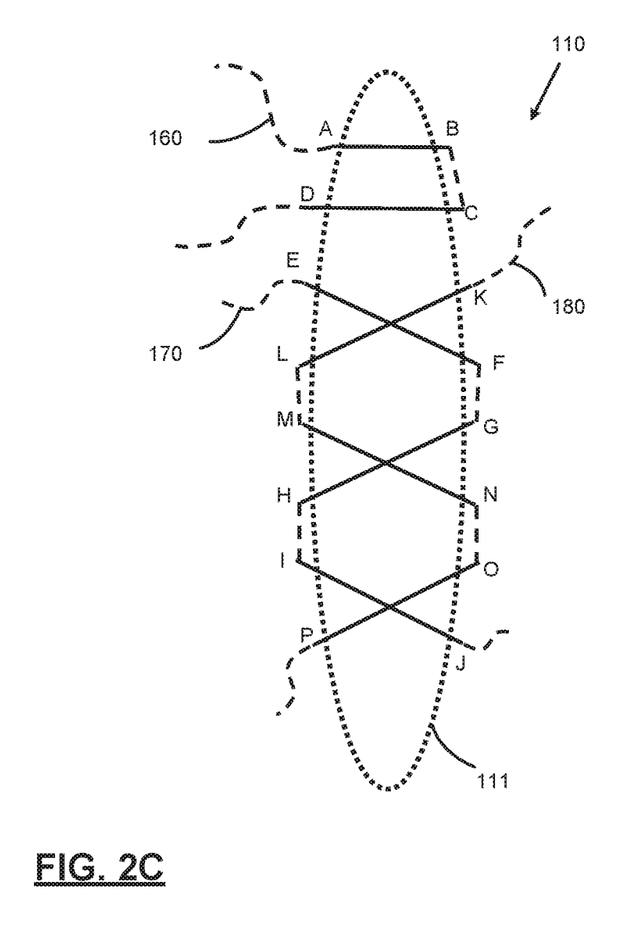
FIG. 2C is a diagram showing a single thread forming a pair of non-crossed laces and a pair of threads forming multiple pairs of crossed laces according to one embodiment of the disclosure.

FIG. 2C is diagram showing a single thread 160 forming a pair of non-crossed laces and a pair of threads 170 and 180 forming multiple pairs of crossed laces according to one embodiment of the disclosure. By way of example, the threads 170 and 180 may be used to form the crossed pairs of laces 122-124 in FIG. 2A.

Perimeter 111 is shown as a dotted line in FIG. 2C for ease of explanation. The thread 160 is inlaid through the textile and exposed through its surfaces at points A, B, C and D. The solid line portions of thread 160 indicate the portions of the thread 160 that are on the upper surface of the textile 100. The dotted line portions of thread 160 indicate the portions of the thread 160 that are on the bottom surface of the textile 100. Initially, the thread 160 is inlaid through point A from the bottom surface of the textile 100 to the upper surface of the textile 100. The thread 160 then crosses the upper surface of the laced region 110 and passes through the point B from the top surface to the bottom surface of the textile 100. The thread 160 then traverses the bottom surface of the textile 100, as indicated by the dotted line between the point B and the point C. Next, the thread 160 passes through the point C from the bottom surface of the textile 100 to the upper surface of the textile 100. Finally, the thread 160 crosses the upper surface of the laced region 110 and passes through the point D from the top surface to the bottom surface of the textile 100.

Similarly, the thread 170 passes through the points E-J and the thread 180 passes through the points K-P. The solid line portions of thread 170 indicate the portions of the thread 170 that are on the upper surface of the textile 100. The dotted line portions of the thread 170 indicate the portions of the thread 170 that are on the bottom surface of the textile 100. The solid line portions of thread 180 indicate the portions of the thread 180 that are on the upper surface of the textile 100. The dotted line portions of the thread 180 indicate the portions of the thread 180 that are on the bottom surface of the textile 100.

It is evident from the lacing patterns of the threads 160, 170, and 180 that it is not necessary for the threads 160, 170, and 180 to traverse the laced region 110 on the bottom surface of the textile 110. As a result, when the threads 160, 170, and 180 tighten, the laced region 110 forms a flap on the bottom surface of the textile 100 without being "pinched" by the tightened threads 160, 170, and 180.

Figure 2D:
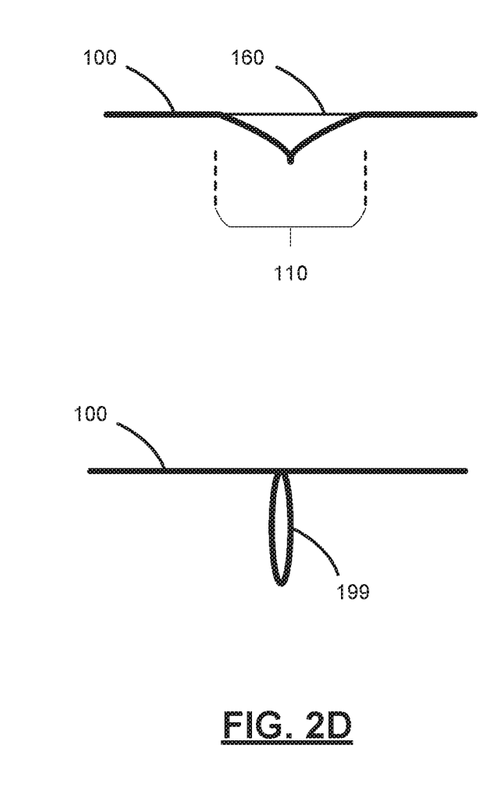
FIG. 2D shows cross-sectional views of the textile in FIG. 2C before and after a lace is tightened.

FIG. 2D shows cross-sectional views of the textile 100 before and after the laces tighten. In the top cross-sectional view, thread 160 spans the laced region 110, which droops slightly due to slack. However, when the thread is tightened, the opposite sides of the laced region 110 are cinched together, the laced region 110 disappears, and a flap (or fold) 199 is formed on the bottom surface of the textile 100.

Figure 3A:
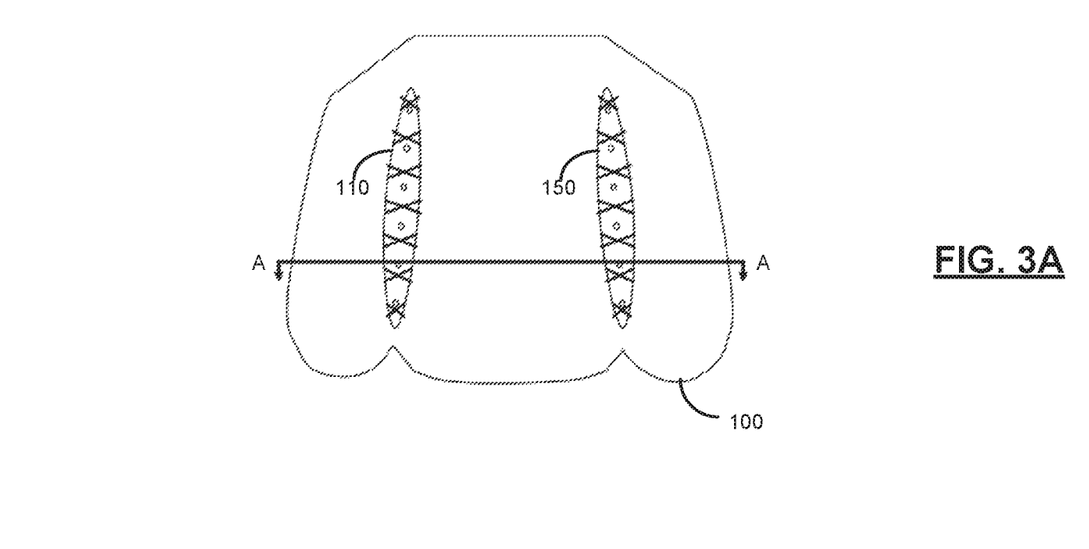
FIG. 3A is a top view of the textile in FIG. 1 with a cross-sectional line A-A.
Figure 3B:
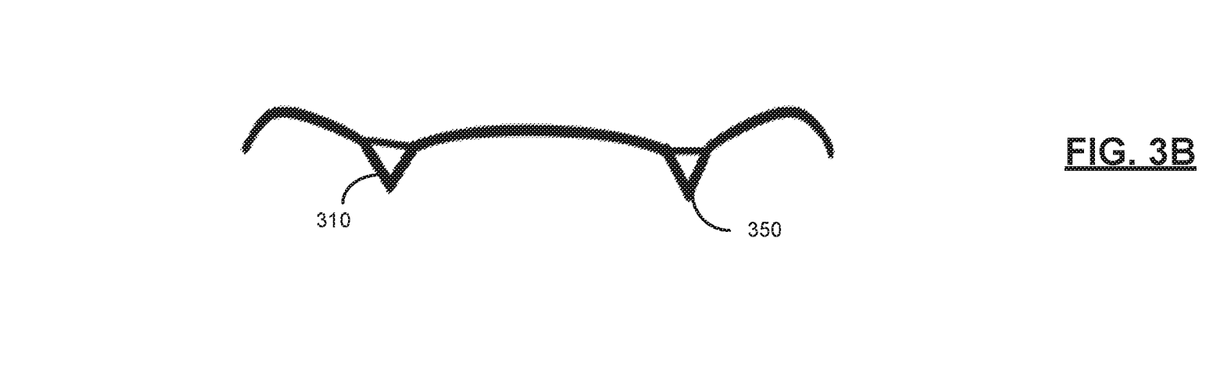
FIG. 3B is a cross-sectional view of the textile in FIG. 3A along cross-sectional line A-A.

FIG. 3A is a top view of the textile 100 in FIG. 1 with a cross-sectional line A-A. FIG. 3B is a cross-sectional view of the textile 100 in FIG. 3A along cross-sectional line A-A. The cross-sectional view along A-A passes through laced regions 110 and 150. In FIG. 3B, the partially tightened laces have begun to form laced region 110 into a flap 310 and have begun to form laced region 150 into a flap 350.

Figure 4A:
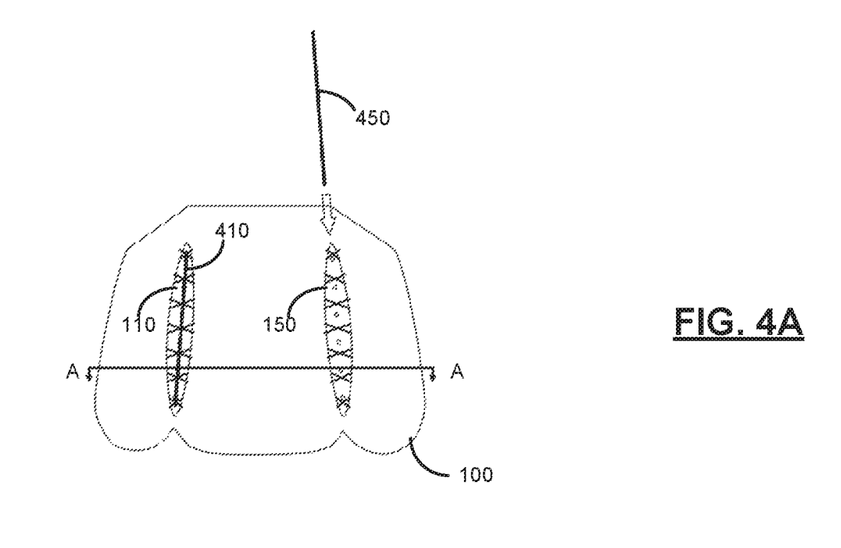
FIG. 4A is a top view of the textile in FIG. 1 including two listing wires associated with the laced regions.
Figure 4B:
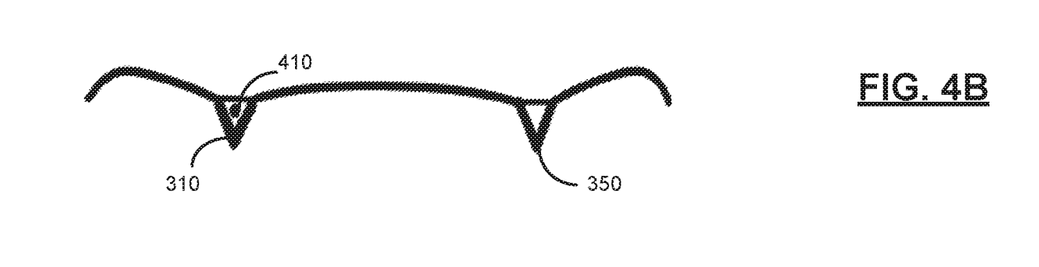
FIG. 4B is a cross-sectional view of the textile in FIG. 4A along cross-sectional line A-A.

FIG. 4A is a top view of the textile 100 in FIG. 1, including two listing wires 410 and 450 associated with the laced regions 110 and 150. In an embodiment, the listing wires 410 and 450 are inserted under the laces after knitting. In FIG. 4A, listing wire 410 is already inserted in laced region 110 under the laces, but listing wire 450 is not yet inserted in laced region 150. FIG. 4B is a cross-sectional view of the textile 100 in FIG. 4A along cross-sectional line A-A. Listing wire 410 is already in the flap 310.

Figure 5A:
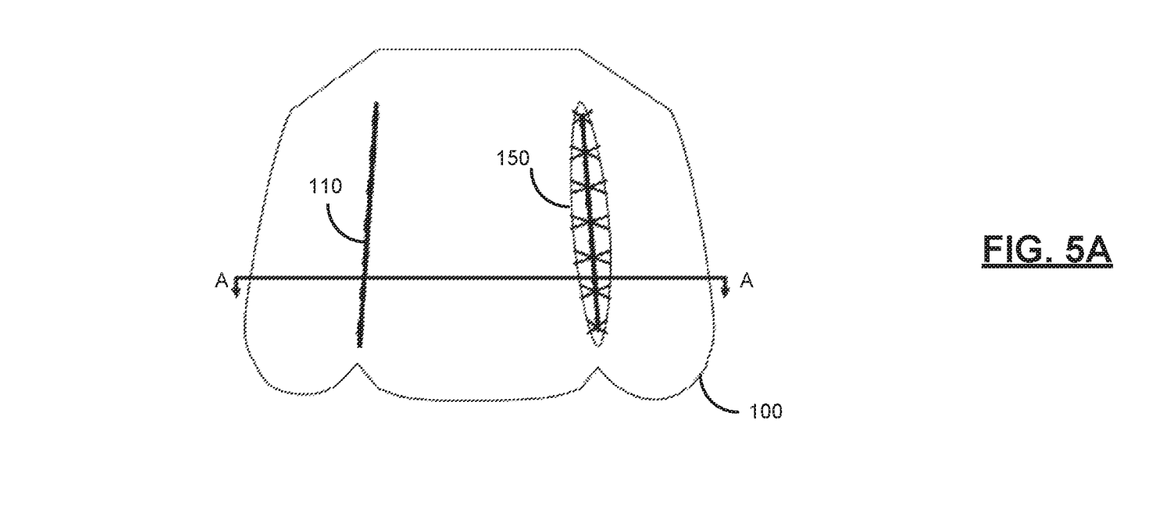
FIG. 5A is a top view of the textile in FIG. 1 including two listing wires associated with the laced regions.

FIG. 5A is a top view of the textile 100 in FIG. 1, including the two listing 410 and 450 wires associated with the laced regions 110 and 150. In FIG. 5A, listing wire 410 is already inserted in laced region 110 and the laces have been tightened completely. The listing wire 450 is inserted in the laced region 150, but the laces in laced region 150 have not yet been tightened.

Figure 5B:
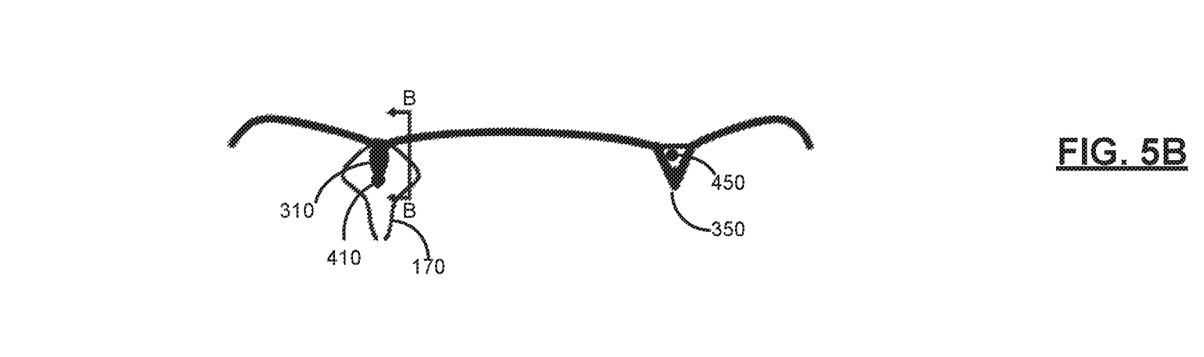
FIG. 5B is a cross-sectional view of the textile in FIG. 5A along cross-sectional line A-A.

FIG. 5B is a cross-sectional view of the textile 100 in FIG. 5A along cross-sectional line A-A. The loose ends of exemplary thread 170 are dangling beneath the closed laced region 110, which now forms the flap 310. The listing wire 410 is inside of the flap 310. In addition, the listing wire 450 is inside the partially closed flap 450.

Figure 5C:
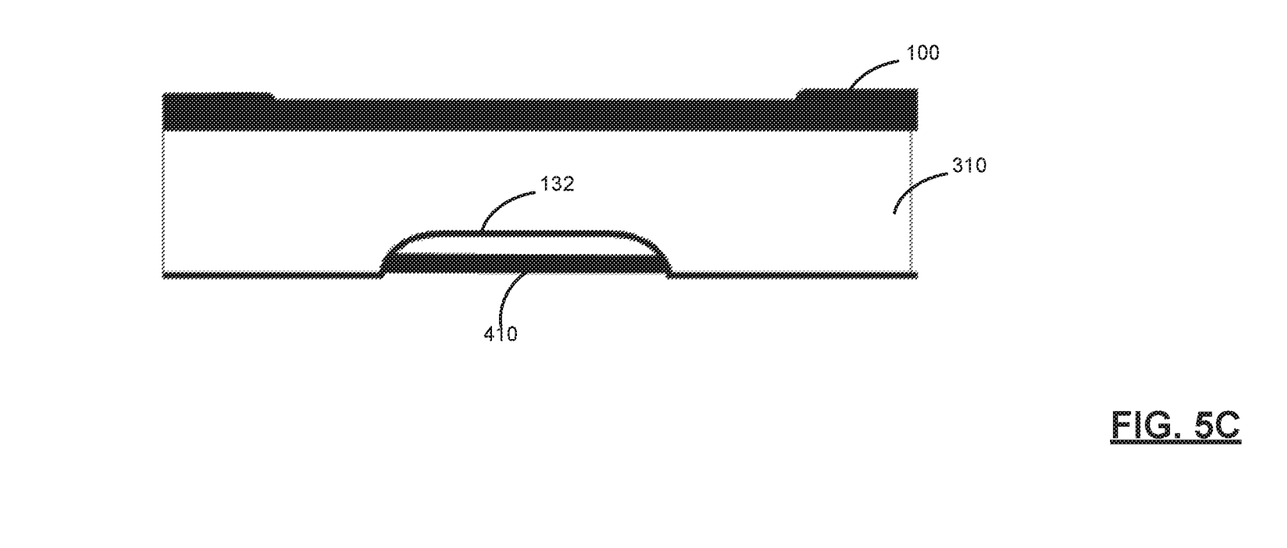
FIG. 5C is a side view of a fold or flap formed in the textile in FIG. 5A.

FIG. 5C is a side view along the line B-B of the fold 310 formed in the textile 100 in FIG. 5A. The fold 310 hangs from the bottom surface of the textile 100. The listing wire 410 is visible in the fold 310 through the perforation 132. The perforations 131-136 enable clips, hooks, clasps, hogrings, or similar grasping devices to attach to the listing wire 410 and to secure the textile 100 to, for example, the cushions of a vehicle seat. The listing wire 410 may be a conventional metal wire, a plastic extrusion, or a similar suitable material. In addition, foam strips may be inserted in the laced regions 110 and 150 along with the listing wires 110 and 150 in order to increase padding between the sitting person and the listing materials.

Figure 6:
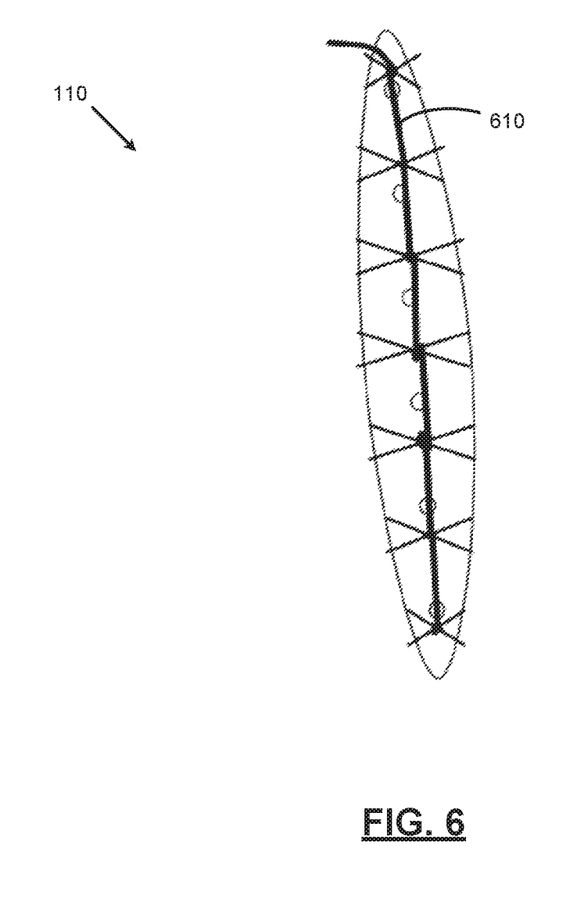
FIG. 6 is a top view of a laced region of the textile in FIG. 1 including a removable thread that may be used to hold the lacings together.

FIG. 6 is a top view of the laced region 110 of the textile 100 in FIG. 1, including a removable thread 610 that may be used to hold the lacings together. The removable thread may be yarn that temporarily holds the laces together during manufacturing, thereby allowing for easier insertion of the listing wires.

Figure 7A:
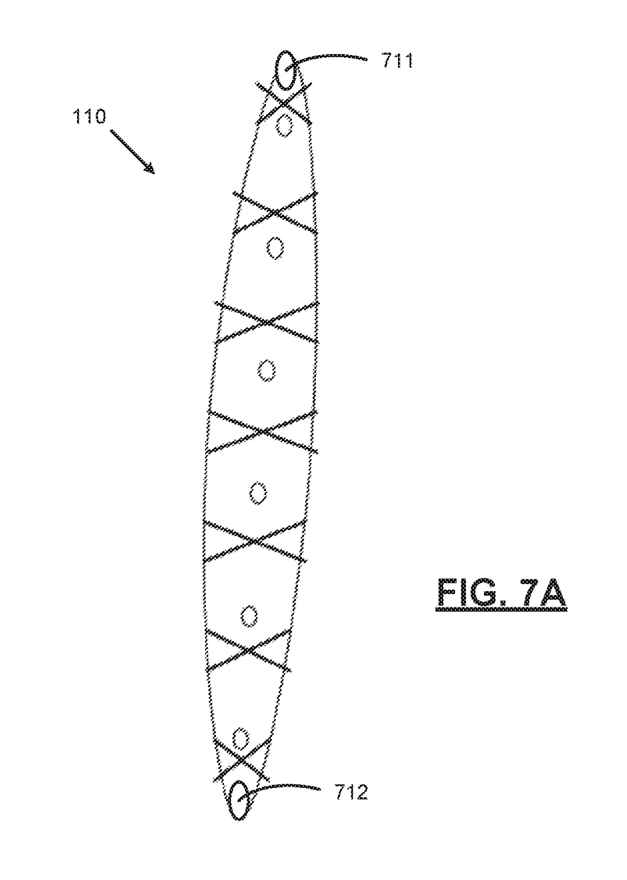
FIG. 7A is a top view of a laced region of the textile in FIG. 1 including additional holes at the ends of the laced region according to one embodiment of the disclosure.
Figure 7B:
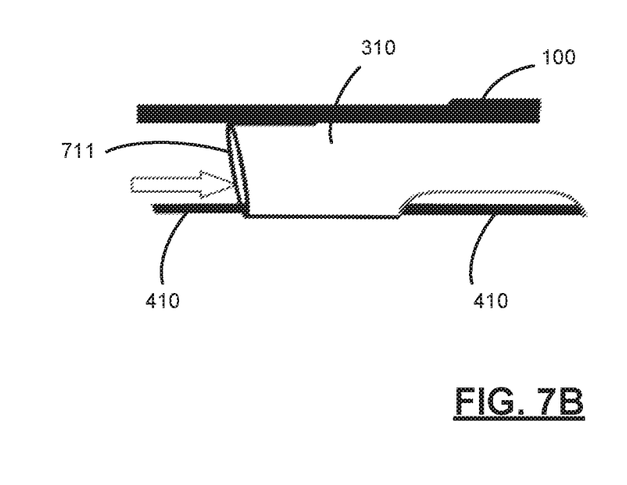
FIG. 7B is a side view of a fold or flap formed in the textile in FIG. 7A.

FIG. 7A is a top view of the laced region 110 of the textile 100 in FIG. 1, including additional holes 711 and 712 at the ends of the laced region 110 according to one embodiment of the disclosure. FIG. 7B is a side view of the flap 310 formed in the textile 100 in FIG. 7A. The hole 711 at one end of the laced region 110 forms an opening at the end of the flap 310 into which the listing wire 410 may be inserted, as indicated by the directional arrow.

This configuration allow the listing wire 410 to be inserted either before or after the seam is cinched shut. Post-cinch insertion ensures that laces cannot be skipped or missed. If tightly knitted, the cinched tie-down could be injected with foam to enhance seat comfort.

Figure 8:
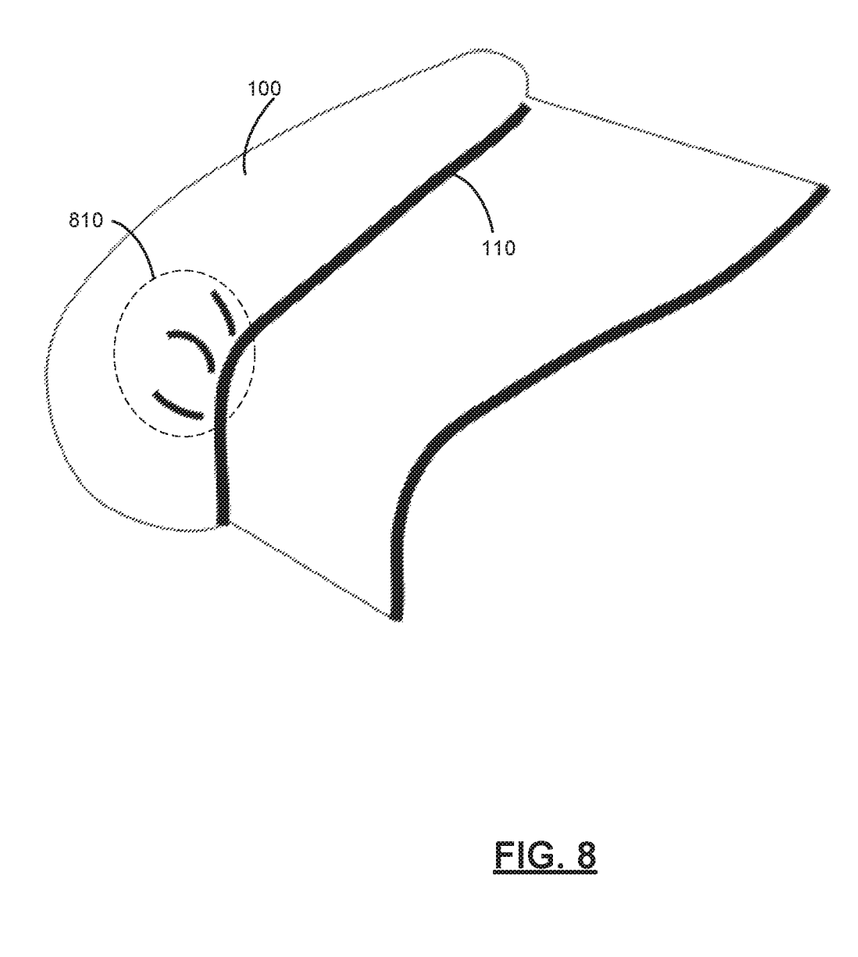
FIG. 8 is a perspective view of a portion of the textile in FIG. 1 after the laces are drawn shut to form a three-dimensional (3D) contoured shape suitable for covering the cushions of a vehicle seat.

FIG. 8 is a perspective view of a portion of the textile 100 in FIG. 1 after the laces are drawn tight to form a three-dimensional (3D) contoured shape suitable for covering the cushions of a vehicle seat. The dotted line 810 indicates an area of pleats formed by the cinching of laced region 110. This pleating may be caused by laced region 110 having an asymmetrical shape that enhances the 3D contouring of the textile 100.

Figure 9A:
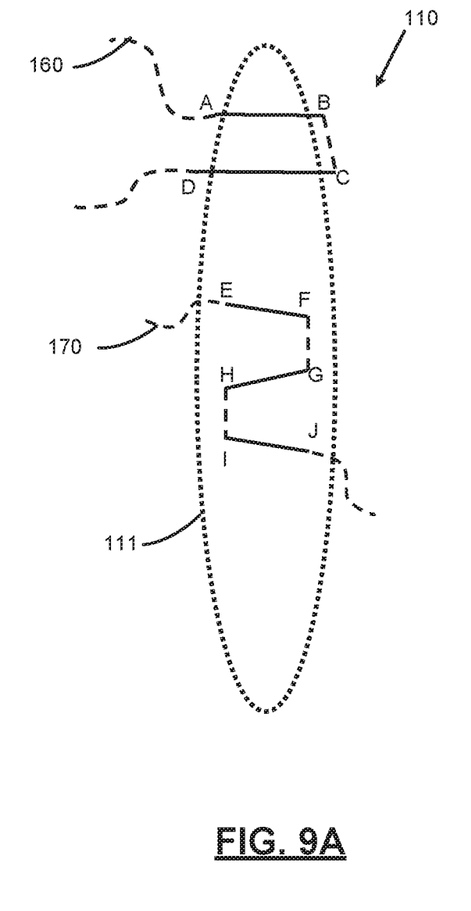
FIG. 9A is a diagram showing a pair of threads forming multiple laces at different depths in the fold or flap according to one embodiment of the disclosure.

FIG. 9A is a diagram showing a pair of threads forming multiple laces at different depths in the fold or flap formed by the laced region 110 according to one embodiment of the disclosure. Perimeter 111 is shown in FIG. 9A as a dotted line in FIG. 2C for ease of explanation. As in FIG. 2C above, the thread 160 is inserted through the points A, B, C and D, which are located just outside the perimeter 111. The solid line portions of thread 160 indicate the portions of the thread 160 that are on the upper surface of the textile 100. The dotted line portions of thread 160 indicate the portions of the thread 160 that are on the bottom surface of the textile 100

However, unlike FIG. 2C, the thread 170 in FIG. 9A passes through the points E-J, which are now located inside the perimeter 111. The solid line portions of thread 170 indicate the portions of the thread 170 that are on the upper surface of the textile 100. The dotted line portions of the thread 170 indicate the portions of the thread 170 that are on the bottom surface of the textile 100. The effect of putting points E-J inside perimeter 111 enables the flap or fold to be tightened at different levels below the surface of textile 100, not merely near the surface, as shown in FIG. 9B.

Figure 9B:
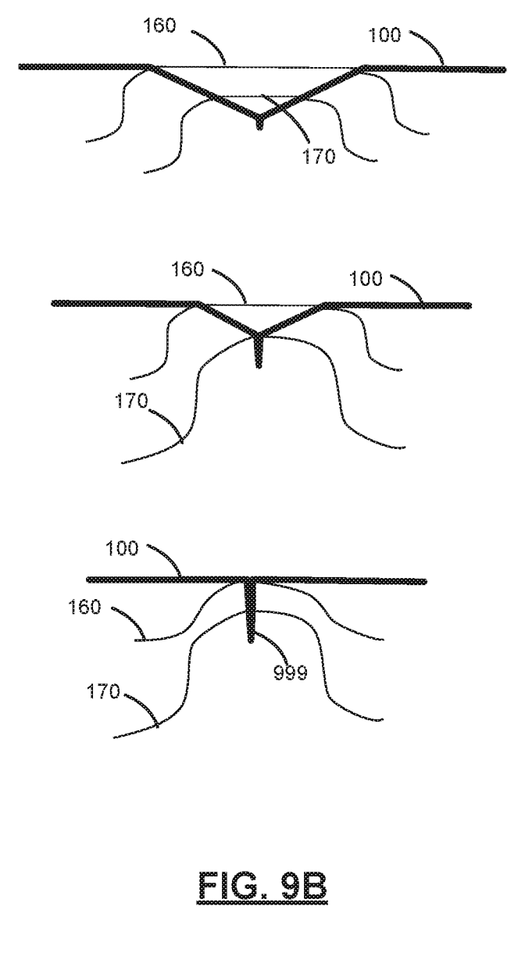
FIG. 9B shows cross-sectional views of the textile in FIG. 9A before and after the laces are tightened.

FIG. 9B shows three cross-sectional views of the textile in FIG. 9A as the laces are tightened. In the top cross-sectional view, threads 160 and 170 span the laced region 110, which droops slightly due to slack. However, in the middle cross-sectional view, the thread 170 is tightened and the middle section of the laced region 110 is cinched together and a flap or fold begins to form. Finally, in the bottom cross-sectional view, the thread 160 is tightened, the laced region 110 disappears, and a flap (or fold) 999 is now completely formed on the bottom surface of the textile 100. However, the flap 999 is strengthened by both thread 160 at the top of the flap 999 and thread 170 at the middle of the flap 999.

The foregoing description is illustrative and is in not intended to limit the disclosure, its application, or uses. Therefore, while this disclosure includes particular examples, the true scope of the disclosure should not be so limited since other modifications will become apparent upon a study of the drawings, the specification, and the following claims. It will be understood that one or more steps within a method might be executed in different order without altering the principles of the disclosure. Further, although each implementation described above has certain features, one or more of the features described with respect to an implementation of the disclosure can be implemented in and/or combined with features of any other implementation, even if that combination is not explicitly described. Hence, the described implementations are not mutually exclusive, and permutations of one or more implementations with one another remain within the scope of this disclosure.

Spatial and functional relationships between elements are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A textile comprising:
a fabric including a first laced region associated with a first surface of the textile, wherein the fabric forms a first plurality of pre-formed perforations within the first laced region and wherein the first laced region has an asymmetrical shape;
a first thread that is inlaid through a first plurality of points proximate a perimeter of the first laced region; and
a first listing wire disposed in the first laced region and aligned with the first plurality of pre-formed perforations,
wherein tightening of the first thread causes opposite sides of the first laced region to be cinched together, thereby forming the first laced region into a first flap associated with a second surface of the textile opposite the first surface.

2. The textile of claim 1, wherein the first listing wire is disposed in the first flap on the second surface when the first thread is tightened.

3. The textile of claim 2, wherein the first listing wire may be accessed by a first attachment device through at least one of the first plurality of pre-formed perforations.

4. The textile of claim 2, wherein:
the fabric further includes a second laced region associated with the first surface of the textile, wherein the fabric forms a second plurality of pre-formed perforations within the second laced region, and the textile further includes:
a second thread that is inlaid through a second plurality of points proximate a perimeter of the second laced region,
a second listing wire disposed in the second laced region and aligned with the second plurality of pre-formed perforations,
wherein tightening of the second thread causes opposite sides of the second laced region to be cinched together, thereby forming the second laced region into a second flap associated with the second surface of the textile opposite the first surface.

5. The textile of claim 4, wherein the second listing wire is disposed in the second flap on the second surface when the second thread is tightened.

6. The textile of claim 5, wherein the second listing wire may be accessed by a second attachment device through at least one of the second plurality of pre-formed perforations.

7. An article of manufacture comprising:
a base structure requiring a cover; and
a textile suitable to cover the base structure comprising:
a fabric including a first laced region associated with a first surface of the textile, wherein the fabric forms a first plurality of pre-formed perforations within the first laced region and wherein the first laced region has an asymmetrical shape;
a first thread that is inlaid through a first plurality of points proximate a perimeter of the first laced region;
a first listing wire disposed in the first laced region and aligned with the first plurality of pre-formed perforations,
wherein tightening of the first thread causes opposite sides of the first laced region to be cinched together, thereby forming the first laced region into a first flap associated with a second surface of the textile opposite the first surface.

8. The article of manufacture of claim 7, wherein the first listing wire is disposed in the first flap on the second surface when the first thread is tightened.

9. The article of manufacture of claim 8, wherein the first listing wire may be accessed by a first attachment device through at least one of the first plurality of pre-formed perforations.

10. The article of manufacture of claim 8, wherein the fabric further includes a second laced region associated with the first surface of the textile, wherein the fabric forms a second plurality of pre-formed perforations within the second laced region, and the textile further includes:
a second thread that is inlaid through a second plurality of points proximate a perimeter of the second laced region; and
a second listing wire disposed in the second laced region and aligned with the second plurality of pre-formed perforations,
wherein tightening of the second thread causes opposite sides of the second laced region to be cinched together, thereby forming the second laced region into a second flap associated with the second surface of the textile opposite the first surface.

11. The article of manufacture of claim 10, wherein the second listing wire is disposed in the second flap on the second surface when the second thread is tightened.

12. The article of manufacture of claim 11, wherein the article of manufacture comprise one of: i) a vehicle seat, ii) a sofa, ii) an arm chair, or iv) another type of furniture.

13. A textile comprising:
a fabric including a first laced region associated with a first surface of the textile, wherein the first laced region has an asymmetrical shape; and
a first thread that is inlaid through a first plurality of points proximate a perimeter of the first laced region,
wherein tightening of the first thread causes opposite sides of the first laced region to be cinched together, thereby forming the first laced region into a first flap associated with a second surface of the textile opposite the first surface.

* * * * *